United States Patent
Mehta et al.

(10) Patent No.: US 10,551,086 B2
(45) Date of Patent: Feb. 4, 2020

(54) SOUND LEVEL CONTROL IN AN HVAC SYSTEM

(71) Applicant: TRANE INTERNATIONAL INC., Davidson, NC (US)

(72) Inventors: Pavak Mehta, La Crescent, MN (US); Sean Smith, Chapmansboro, TN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 121 days.

(21) Appl. No.: 15/837,527

(22) Filed: Dec. 11, 2017

(65) Prior Publication Data

US 2018/0163989 A1 Jun. 14, 2018

Related U.S. Application Data

(63) Continuation of application No. 14/693,487, filed on Apr. 22, 2015, now Pat. No. 9,841,210.

(Continued)

(51) Int. Cl.
*F25B 49/02* (2006.01)
*F24F 13/24* (2006.01)
*F24F 120/20* (2018.01)

(52) U.S. Cl.
CPC .......... *F24F 13/24* (2013.01); *F24F 2120/20* (2018.01); *F25B 49/02* (2013.01); *F25B 2500/12* (2013.01);

(Continued)

(58) Field of Classification Search
CPC .............. F25B 2500/12; F25B 2500/13; F25B 2600/0253; F24F 1/12; F24F 13/24
See application file for complete search history.

(56) References Cited

U.S. PATENT DOCUMENTS

| 3,945,432 A | 3/1976 | Tamblyn |
| 5,010,739 A | 4/1991 | Isshiki et al. |

(Continued)

FOREIGN PATENT DOCUMENTS

| JP | 09-089347 | 4/1997 | |
| JP | 11-201608 | 7/1999 | |
| WO | WO-2013014857 A1 * | 1/2013 | ........... F25D 23/006 |

OTHER PUBLICATIONS

Final Rejection, U.S. Appl. No. 14/693,501, dated Oct. 2, 2018, 41 pages.

(Continued)

*Primary Examiner* — Edward F Landrum
*Assistant Examiner* — Daniel C Comings
(74) *Attorney, Agent, or Firm* — Hamre, Schumann, Mueller & Larson, P.C.

(57) ABSTRACT

A system and method for controlling a sound level in a heating, ventilation, and air conditioning (HVAC) system are disclosed. The system includes a refrigeration unit including a compressor, a condenser fan, a controller, and a sound controller. The sound controller is configured to maintain a sound level of the refrigeration unit within a sound level operating range. A method of controlling a refrigeration unit for a heating, ventilation, and air conditioning (HVAC) system is described. The method includes determining, by a controller, a cooling requirement of a conditioned space. The controller also determines a sound level operating range for the refrigeration unit. The method further includes the controller applying a cooling setting based on the cooling requirement and the sound level operating range.

13 Claims, 3 Drawing Sheets

Related U.S. Application Data

(60) Provisional application No. 61/982,520, filed on Apr. 22, 2014.

(52) U.S. Cl.
CPC . *F25B 2600/0253* (2013.01); *F25B 2700/172* (2013.01); *F25B 2700/173* (2013.01); *Y02B 30/741* (2013.01)

(56) References Cited

U.S. PATENT DOCUMENTS

| | | | |
|---|---|---|---|
| 5,203,178 A | 4/1993 | Shyu | |
| 5,261,252 A | 11/1993 | Peruch | |
| 5,341,650 A | 8/1994 | Nagasawa et al. | |
| 5,457,750 A | 10/1995 | Ahn | |
| 5,522,768 A | 6/1996 | Brodt et al. | |
| 5,636,287 A | 6/1997 | Kubli et al. | |
| 5,777,897 A | 7/1998 | Giorgio | |
| 5,907,955 A | 6/1999 | Park | |
| 5,950,439 A | 9/1999 | Peterson et al. | |
| 6,049,615 A | 4/2000 | Chou et al. | |
| 6,194,858 B1 | 2/2001 | Chen | |
| 6,257,007 B1 | 7/2001 | Hartman et al. | |
| 6,290,140 B1 | 9/2001 | Pesko et al. | |
| 6,381,406 B1 | 4/2002 | Smith et al. | |
| 6,536,675 B1 | 3/2003 | Pesko et al. | |
| 6,625,285 B1 | 9/2003 | Ohashi | |
| 6,928,826 B2 | 8/2005 | Lee et al. | |
| 6,931,873 B2 | 8/2005 | Oomura et al. | |
| 7,456,597 B2 | 11/2008 | Kanamori | |
| 7,517,185 B2 | 4/2009 | Hirakawa et al. | |
| 7,640,761 B2 | 1/2010 | Garrett et al. | |
| 7,743,617 B2 * | 6/2010 | Crane .................... F25B 49/02 62/163 |
| 7,845,182 B2 | 12/2010 | Yelles | |
| 7,900,462 B2 | 3/2011 | Hegar et al. | |
| 8,195,313 B1 | 6/2012 | Fadell et al. | |
| 8,291,720 B2 * | 10/2012 | Hartman .............. F04D 27/0261 62/228.5 |
| 8,813,511 B2 | 8/2014 | Kopko et al. | |
| 9,299,332 B2 | 3/2016 | Je | |
| 9,422,861 B2 | 8/2016 | Miyagawa | |
| 2003/0053004 A1 | 3/2003 | Yoon | |
| 2004/0176877 A1 | 9/2004 | Hesse et al. | |
| 2004/0264125 A1 | 12/2004 | Cheng et al. | |
| 2005/0030171 A1 | 2/2005 | Liu et al. | |
| 2005/0047762 A1 | 3/2005 | Liu et al. | |
| 2005/0056481 A1 | 3/2005 | Mafi et al. | |
| 2005/0223725 A1 | 10/2005 | Crane et al. | |
| 2006/0179859 A1 | 8/2006 | Nakata et al. | |
| 2007/0079313 A1 | 4/2007 | Sakurai | |
| 2008/0245504 A1 | 10/2008 | Eisenhour | |
| 2008/0311840 A1 | 12/2008 | Rainey et al. | |
| 2009/0034746 A1 | 2/2009 | Nozaki | |
| 2009/0037152 A1 | 2/2009 | Holahan et al. | |
| 2010/0094466 A1 | 4/2010 | Judge et al. | |
| 2010/0247339 A1 | 9/2010 | Lagemann | |
| 2011/0010015 A1 | 1/2011 | Jordan et al. | |
| 2011/0061967 A1 | 3/2011 | Penner et al. | |
| 2011/0308883 A1 | 12/2011 | Eaton et al. | |
| 2012/0171947 A1 | 7/2012 | Takeda et al. | |
| 2013/0008633 A1 | 1/2013 | Gradinger et al. | |
| 2013/0131886 A1 | 5/2013 | Nitta et al. | |
| 2013/0201316 A1 | 8/2013 | Binder et al. | |
| 2014/0094973 A1 | 4/2014 | Giaimo et al. | |
| 2014/0309789 A1 | 10/2014 | Ricci | |
| 2014/0316581 A1 | 10/2014 | Fadell et al. | |
| 2014/0360805 A1 | 12/2014 | Berkman et al. | |
| 2015/0036832 A1 | 2/2015 | Usher et al. | |

OTHER PUBLICATIONS

Office Action, U.S. Appl. No. 14/693,501, dated Apr. 3, 2017 (40 pages).

\* cited by examiner

SOUND LEVEL CONTROL IN AN HVAC SYSTEM

FIELD

This disclosure relates generally to a heating, ventilation, and air conditioning (HVAC) system. More specifically, the disclosure relates to controlling a sound level of a refrigeration unit in an HVAC system.

BACKGROUND

A heating, ventilation, and air conditioning (HVAC) system generally includes a compressor, a condenser, an expansion device, and an evaporator, forming a refrigeration circuit. The HVAC system also generally includes a condenser fan. The condenser fan is configured to circulate air over the condenser in order to reject heat from a refrigerant contained within the condenser. The condenser fan and compressor of an HVAC system can be combined in a single unit (e.g., a refrigeration unit). One or more refrigeration units can be included in an HVAC system for a building based on the cooling requirements of the building. A refrigeration unit generates sound and vibration when the compressor and condenser fan are operating. Depending on a location of a building, an HVAC system for the building may have maximum sound level limits that cannot be exceeded, for example, based on local ordinances or other similar regulations.

SUMMARY

This disclosure relates generally to a heating, ventilation, and air conditioning (HVAC) system. More specifically, the disclosure relates to controlling a sound level of a refrigeration unit in an HVAC system.

A refrigeration unit in an HVAC system can include, but is not limited to, an air-cooled water chiller, an air-cooled condenser unit, a compressor unit, or other similar refrigeration unit including one or more compressors and one or more condenser fans. In some embodiments, the refrigeration unit includes one or more variable speed compressors and one or more variable speed condenser fans. Aspects described herein can be applied to, for example, split systems, unitary equipment, rooftop equipment, or the like.

In some embodiments, a refrigeration unit in an HVAC system includes a compressor, a condenser, and a condenser fan. In some embodiments, the refrigeration unit can include a plurality of compressors. In some embodiments, the refrigeration unit can include a plurality of condenser fans. The refrigeration unit can be configured to include a sound controller to limit a maximum sound level of the refrigeration unit.

In some embodiments, the compressor is a variable speed compressor. More specifically, in some embodiments, the compressor is a variable speed screw compressor. In some embodiments, the compressor can be another type of compressor, such as a reciprocating, scroll, positive displacement, centrifugal, or other suitable type of compressor.

In some embodiments, the condenser fan is a variable speed condenser fan. The variable speed condenser fan can, for example, be an axial fan.

In some embodiments, a sound controller can control whether a refrigeration system operates in an efficiency mode or a sound level control mode. The sound controller can be configured to operate the refrigeration system in the efficiency mode by default and enter the sound level control mode if a user overrides the default setting. In some embodiments, the sound controller can be configured to operate the refrigeration system in the sound level control mode by default and enter the efficiency mode if a user overrides the default setting. Examples of overriding the default setting include, but are not limited to, providing a schedule of times in which to operate the refrigeration system in the sound level control mode and a schedule of times in which to operate the refrigeration system in the efficiency mode.

In some embodiments, a sound controller can determine a sound level operating range using, for example, a regression model (e.g., one or more regression equations or the like). In some embodiments, the sound controller can use the regression model to determine sound levels based on one or more conditions such as, but not limited to, a speed of the compressor, a speed of the condenser fan, an inlet/outlet condition of the compressor, or the like. In such embodiments, the correlations between sound levels and one or more conditions can, for example, be determined through simulation testing.

A method of controlling a refrigeration unit for a heating, ventilation, and air conditioning (HVAC) system is described. The method includes determining, by a controller, a cooling requirement of a conditioned space. The controller also determines a sound level operating range for the refrigeration unit. The method further includes the controller applying a cooling setting based on the cooling requirement and the sound level operating range.

A method of controlling a refrigeration unit for a heating, ventilation, and air conditioning (HVAC) system is described. The method includes determining, by a controller, a sound level operating range for a refrigeration unit. The controller determines a cooling requirement of a conditioned space and an operating condition range of the compressor and an operating condition range of the condenser fan. The operating condition ranges of the compressor and the condenser fan are calculated from one or more regression equations. The controller applies a cooling setting based on the cooling requirement that is within the operating condition ranges of the compressor and the condenser fan.

A method of controlling a refrigeration unit for a heating, ventilation, and air conditioning (HVAC) system is described. The method includes determining a sound level of a compressor with a first sensor and a sound level of a condenser fan with a second sensor. The method further includes calculating, by a sound controller, a sound level of the refrigeration unit based on the sound levels of the compressor and the condenser fan and reducing the sound level of the refrigeration unit in response to the sound level being outside a sound level operating range.

A heating, ventilation, and air conditioning (HVAC) system is described. The system includes a refrigeration unit including a compressor, a condenser fan, a controller, and a sound controller. The sound controller is configured to maintain a sound level of the refrigeration unit within a sound level operating range.

BRIEF DESCRIPTION OF THE DRAWINGS

References are made to the accompanying drawings that form a part of this disclosure, and which illustrate embodiments in which the systems and methods described in this specification may be practiced.

Like reference numbers represent like parts throughout.

DETAILED DESCRIPTION

Figure 1:
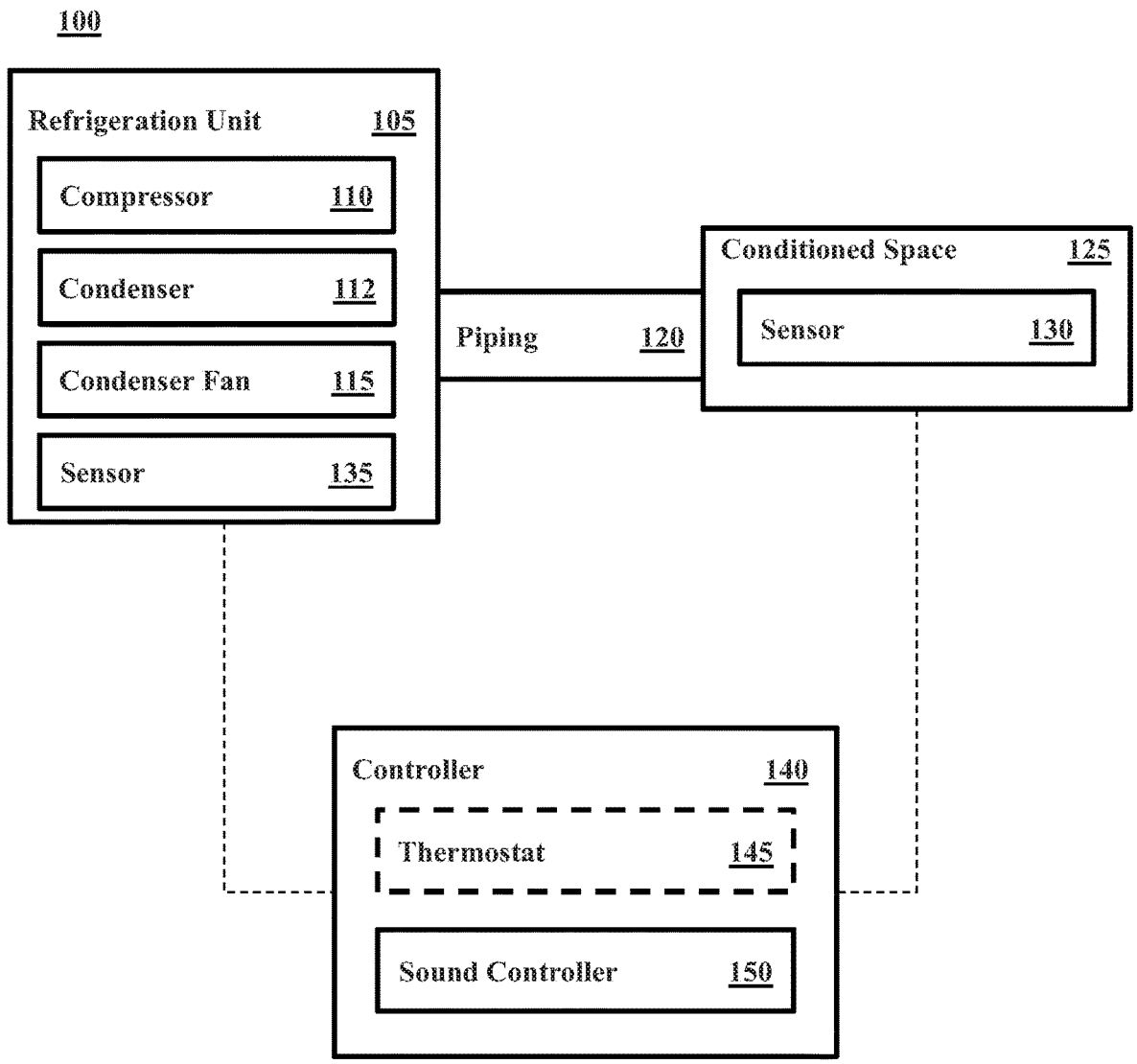
FIG. 1 illustrates a block diagram of a heating, ventilation, and air conditioning (HVAC) system, according to some embodiments.

This disclosure relates generally to a heating, ventilation, and air conditioning (HVAC) system. More specifically, the disclosure relates to controlling a sound level of a refrigeration unit in an HVAC system.

An HVAC system includes a refrigeration unit. The refrigeration unit can include a plurality of components such as, but not limited to, a compressor, a condenser, an evaporator, and a condenser fan. Refrigeration units can be incorporated into an HVAC system for a building that has a maximum sound level limit. The maximum sound level limit may be set, for example, by a local or state regulation (e.g., a city ordinance providing a period, often at night, during which sound levels cannot exceed a maximum sound level limit, for example, as measured at a lot line). In situations in which the refrigeration unit cannot exceed a maximum sound level limit, the HVAC system for the building can include a refrigeration unit having a sound controller.

A refrigeration unit including a sound controller can be included in an HVAC system constrained by a maximum sound level limit. When a refrigeration unit is operating under a maximum sound level constraint, the refrigeration unit may be operating at a lower efficiency than a refrigeration unit without a maximum sound level constraint. For example, the lower efficiency may be caused by reducing an operating speed of the condenser fan to meet the required reduction in sound level.

Refrigeration units known in the art can include either a sound level control mode or an efficiency mode, but not both. As a result, a refrigeration unit with a sound level control mode may, for example, be unable to provide the same efficiency as a refrigeration unit without a sound level control mode even when the refrigeration unit with the sound level control mode does not have a maximum sound level limit.

Embodiments described herein are directed to systems and methods for controlling a refrigeration unit so that it operates within a desired sound level operating range. The refrigeration unit can be configured with a sound controller (discussed in additional detail below) to, for example, control a capacity of the refrigeration unit so that the refrigeration unit operates in an efficiency mode during periods in which there are no sound level limitations (or if the maximum capacity of the compressor and condenser fan does not raise the sound level above the maximum sound level limit) and in a sound level control mode during periods in which there is a maximum sound level limit. In some embodiments, controlling a capacity of the refrigeration unit can include controlling a speed of a variable speed compressor and/or a speed of a variable speed condenser fan. In some embodiments, controlling a capacity of the refrigeration unit can include, for example, reducing a number of compressors and/or condenser fans running, or the like.

A "sound level" includes, for example, a sound power level, a sound pressure level, or the like.

A "sound power level" includes, for example, an inherent property of a refrigeration unit. In some embodiments, a sound power level can alternatively be referred to as a sound level. For example, a refrigeration unit that produces 90 decibels (dB) of a sound power level will produce this regardless of where it is located or measured. The sound power level can be expressed in terms of dBs relative to a reference sound power:

$$L_w = 10\log_{10}\left(\frac{\text{sound power, } W}{10^{-12} W}\right)$$

where "$L_w$" is the sound power level, and "sound power, W" and "$10^{-12}$ W" are the sound powers. Note that the "sound power level" and the "sound power" are different. The former is a quantity expressed in terms of dBs, while the latter is a quantity expressed in terms of watts. In some embodiments, an operation of a refrigeration unit is controlled so as to obtain a desired range of a sound power level.

A "sound pressure level" includes, for example, a sound property that is dependent on a location of the measurement relative to the refrigeration unit. For example, a refrigeration unit will be louder if the measurement is taken from about one meter away than if the measurement is taken from about five meters away. A sound pressure level can be expressed in terms of dBs relative to a reference sound pressure:

$$L_P = 20\log_{10}\left(\frac{\text{sound pressure, } \mu Pa}{20 \ \mu Pa}\right)$$

where "$L_p$" is the sound pressure level, and "sound pressure, μPa" and "20 μPa" are the sound pressures. Note that the "sound pressure level" and "sound pressure" are different. The former is a quantity expressed in terms of dBs, while the latter is a quantity expressed in terms of Pascals.

An "efficiency mode" includes, for example, a standard operating mode for a refrigeration unit in an HVAC system. The efficiency mode includes cooling according to a cooling requirement. In the efficiency mode, the refrigeration unit can be set at its maximum capacity. In some embodiments, a maximum capacity can include a compressor set at its maximum speed and one or more condenser fans can be set at their maximum speed, according to some embodiments. In some embodiments of the efficiency mode, the refrigeration unit can be set at less than its maximum capacity. In such embodiments of the efficiency mode, the compressor and the condenser fan can be set at a speed lower than the maximum speed to meet the cooling requirement (e.g., at partial load). The efficiency mode may, in some embodiments, be referred to as the efficiency mode or as a standard operating mode.

A "sound level control mode" includes, for example, an operating mode for a refrigeration unit in an HVAC system in which one or more components (e.g., a compressor, a condenser fan) of the refrigeration unit are set such that the sound level is below a maximum sound level limit. In some embodiments, this includes reducing a capacity of the compressor and/or the condenser fan, which can include reducing a speed of a variable speed compressor and/or a speed of a variable speed condenser fan. In some embodiments, this can include reducing an efficiency of the refrigeration unit without reducing a capacity of the refrigeration unit (e.g., increasing a speed of the variable speed compressor and reducing a speed of the variable speed condenser fan or vice versa). The sound level control mode may be referred to as a quiet mode, a reduced sound level mode, or other descriptions representing similar functionality.

A "maximum compressor speed" includes, for example, a maximum RPM at which a variable speed compressor in a refrigeration unit is capable of operating.

A "maximum condenser fan speed" includes, for example, a maximum RPM at which a variable speed condenser fan in a refrigeration unit is capable of operating.

A "maximum allowable compressor speed" includes, for example, a maximum RPM at which a variable speed compressor in a refrigeration unit can operate when constrained by a maximum sound level limit.

A "maximum allowable condenser fan speed" includes, for example, a maximum RPM at which a variable speed condenser fan in a refrigeration unit can operate when constrained by a maximum sound level limit.

A "sound level operating range" includes, for example, an operating range for a refrigeration unit in which the sound level does not exceed a maximum sound level limit.

A "maximum sound level limit" includes, for example, a maximum sound pressure level and/or a maximum sound power level at which a refrigeration unit in an HVAC system can operate. The maximum sound level limit can be, for example, based on an ordinance or other rule, in some embodiments.

FIG. 1 illustrates a block diagram of a heating, ventilation, and air conditioning (HVAC) system 100, according to some embodiments. The HVAC system 100 generally can be configured to control one or more environmental conditions such as, but not limited to, temperature, humidity, air quality, or the like, in a conditioned space 125.

The HVAC system 100 includes a refrigeration unit 105, piping 120, and a controller 140. In some embodiments, the piping 120 can alternatively represent ductwork. In some embodiments, the refrigeration unit 105 can alternatively be referred to as a condenser unit, a chiller, or the like.

The refrigeration unit 105 can be installed inside of, on, or near a building including the conditioned space 125. The refrigeration unit 105 can include a compressor 110, a condenser 112, a condenser fan 115, and a sensor 135. The refrigeration unit 105 can include fewer or additional components. Examples of additional components include, but are not limited to, an evaporator, an expansion device, an economizer, or the like.

The compressor 110 can be a variable speed compressor such as, but not limited to, a variable speed screw compressor. In some embodiments, the compressor 110 can be another type of variable speed compressor. Examples of other compressors include, but are not limited to, variable speed scroll compressors, variable speed reciprocating compressors, variable speed positive displacement compressors, variable speed centrifugal compressors, and other variable speed compressors suitable for use in an HVAC system. It is to be appreciated that a variable speed compressor is not required in some embodiments and that such embodiments can include a compressor that does not include variable speeds (e.g., a plurality of fixed speed compressors).

The condenser fan 115 can be a variable speed condenser fan. In some embodiments, the condenser fan 115 can be a variable speed axial condenser fan. It is to be appreciated that the condenser fan 115 can be a variable speed fan other than a variable speed axial condenser fan.

The refrigeration unit 105 can include a plurality of condenser fans 115, according to some embodiments. It is to be appreciated that a variable speed condenser fan is not required in some embodiments and that such embodiments can include a condenser fan that does not include variable speeds (e.g., a plurality of fixed speed condenser fans).

The sensor 135 can include one or more sensors relating to the operation of the refrigeration unit 105. For example, the sensor 135 can be a sound level sensor that may have a microphone configured to provide a sound level of the condenser fan 115. In some embodiments, the sensor 135 can be a sound level sensor that may have a microphone configured to provide a sound level of the compressor 110. Some embodiments can include both a sound level sensor that may have a microphone configured to provide a sound level of the condenser fan 115 and a sound level sensor that may have a microphone configured to provide a sound level of the compressor 110.

In some embodiments, the sensor 135 can be an RPM (revolutions per minute) sensor to provide a speed of the compressor 110. In some embodiments, the sensor 135 can be an RPM sensor to provide a speed of the condenser fan 115.

In some embodiments, the sensor 135 can be a sensor configured to sense either an inlet condition of the compressor 110 or an outlet condition of the compressor 110.

In some embodiments, the sensor 135 can be an accelerometer configured to provide acceleration of the compressor 110. In some embodiments, the sensor 135 can be an accelerometer to provide an acceleration of the condenser fan 115. In some embodiments, an accelerometer can be included for the compressor 110 and the condenser fan 115.

In some embodiments, the sensor 135 can be a pressure transducer configured to measure a dynamic pressure of refrigerant in the refrigeration circuit.

It is to be appreciated that the refrigeration unit 105 can include one or more of the previously described types of sensors 135 in combination.

In some embodiments, the HVAC system 100 can include one or more additional aspects. In some embodiments, the HVAC system 100 can include a sensor for measuring a sound level that is located remotely from the refrigeration unit 105 and that is in communication with the controller 140. For example, in some embodiments, the HVAC system 100 can include a sensor located at about a property line in order to measure a sound level.

The refrigeration unit 105 can control one or more environmental conditions such as, but not limited to, temperature, humidity, and/or air quality of the conditioned space 125. In some embodiments, the refrigeration unit 105 can cool water that is in communication with the conditioned space 125 via the piping 120. In some embodiments, the piping 120 can be ductwork that provides conditioned air to the conditioned space 125. The piping 120 (or ductwork) can also serve as a return from the conditioned space 125.

The conditioned space 125 includes any space which is to have one or more controlled environmental conditions such as, but not limited to, temperature, humidity, and/or air quality. The one or more environmental conditions can be controlled, for example, for the comfort of occupants, to preserve temperature and/or humidity-sensitive goods, or the like. The conditioned space 125 can include one or more sensors 130. The one or more sensors 130 can provide feedback describing the current conditions in the conditioned space 125. The one or more sensors 130 can, for example, provide temperature, humidity, and/or air quality readings from the conditioned space 125. The one or more sensors 130 can provide the current condition feedback to the controller 140.

The controller 140 is in communication with the refrigeration unit 105. In some embodiments, the controller 140 is also in communication with the conditioned space 125. The controller 140 can be configured to manage, command, direct, and regulate the behavior of one or more components of the refrigeration unit 105, such as, but not limited to, a capacity of the compressor 110 and/or the condenser fan 115. In some embodiments, if the compressor 110 is a variable speed compressor, the controller 140 can control the capacity of the compressor 110 by modifying a speed of the compressor 110. In some embodiments, if the condenser fan is a variable speed condenser fan, the controller 140 can control the capacity of the condenser fan by modifying a speed of the variable speed condenser fan 115. The controller 140 can control the refrigeration unit 105 to obtain various operating conditions such as, but not limited to, temperature, humidity, and/or air quality in the conditioned space 125.

The controller 140 can include a processor, a memory, a clock, and an input/output (I/0) interface. In some embodiments, the controller 140 can include fewer or additional components.

The controller 140 includes a sound controller 150. Depending on the type of refrigeration unit 105, the controller can also include a thermostat 145. For example, an air-cooled water chiller generally does not require the thermostat 145. The thermostat 145 operates according to principles known in the art. For example, the thermostat 145 can be configured to control the refrigeration unit 105 to maintain one or more desired environmental conditions such as, but not limited to, temperature, humidity, and/or air quality in the conditioned space 125. The thermostat 145 can receive information about the operating conditions in the conditioned space 125 from the one or more sensors 130. In some embodiments, the thermostat 145 can be configured by a user. Examples of users include, but are not limited to, maintenance engineers, HVAC technicians, or the like. In some embodiments, the refrigeration unit 105 can be controlled by an internal processor and/or a building automation system or the like, either in combination with the controller 140 or in place of the controller 140.

The sound controller 150 can operate in conjunction with the thermostat 145 if present. The sound controller 150 can be configured to control a sound level operating range at which the refrigeration unit 105 can operate. In some embodiments, the sound level operating range is based on a maximum sound level limit. The maximum sound level limit can be configured according to a variety of conditions such as, but not limited to, a schedule. For example, the sound controller 150 can be configured such that between 9 PM and 6 AM a maximum sound level limit is not exceeded. In some embodiments, the maximum sound level limit can be based, for example, on a local or state regulation, a user preference, or the like.

The sound controller 150 can calculate an expected sound level of the refrigeration unit 105 and control operation of the refrigeration unit 105. In some embodiments, controlling operation of the refrigeration unit 105 can include controlling the speeds of the compressor 110 and/or the condenser fan 115 based on the expected sound level and maximum sound level limit. In some embodiments, the sound controller 150 can include a regression model (e.g., one or more regression equations or the like) to determine sound levels based on one or more conditions such as, but not limited to, a speed of the compressor 110, a speed of the condenser fan 115, an inlet/outlet condition of the compressor 110, or the like. In some embodiments, the sound controller 150 can include a lookup table including sound levels based on one or more conditions such as, but not limited to, a speed of the compressor 110, a speed of the condenser fan 115, or the like. In some embodiments, the regression model can be used to estimate a sound level of the refrigeration unit 105 based on one or more operating conditions (e.g., speed of the compressor 110 and/or the condenser fan 115, inlet/outlet conditions of the compressor 110, or the like). In some embodiments, a sound level can be used to identify operating condition ranges for the refrigeration unit 105 (e.g., an operating condition range for the compressor 110 and an operating condition range for the condenser fan 115, or the like) that will fall within the sound level operating range. In such embodiments, the correlations between sound levels and the one or more conditions can, for example, be determined through simulation testing. In some embodiments, the sensors 130 and 135 can provide feedback concerning the current conditions in the conditioned space 125 and the sound level of the compressor 110 and the condenser fan 115, which the sound controller 150 can use to limit the sound level of the refrigeration unit 105. In some embodiments, a maximum sound level limit may be set to be slightly higher than the maximum sound level of the refrigeration unit 105. The maximum sound level limit is capable of being overridden based on, for example, a user's specific requirements. The process of controlling the speeds of the compressor 110 and condenser fan 115 are discussed in additional detail in accordance with FIGS. 2 and 3 below.

The controller 140 can be configured to control the operation of the refrigeration unit 105. In some embodiments, controlling the operation of the refrigeration unit 105 can include modifying the speed of the compressor 110 and/or the condenser fan 115. Modifying the speed of the compressor 110 and/or the condenser fan 115 is discussed in additional detail in accordance with FIGS. 2 and 3 below. In some embodiments, for example, when the refrigeration unit includes multiple fixed-speed compressors, the controller 140 can be configured to selectively power on and power off one or more of the compressors to control a sound level. Similarly, in some embodiments, the controller 140 can be configured to selectively power on and off one or more of the condenser fans.

Figure 2:
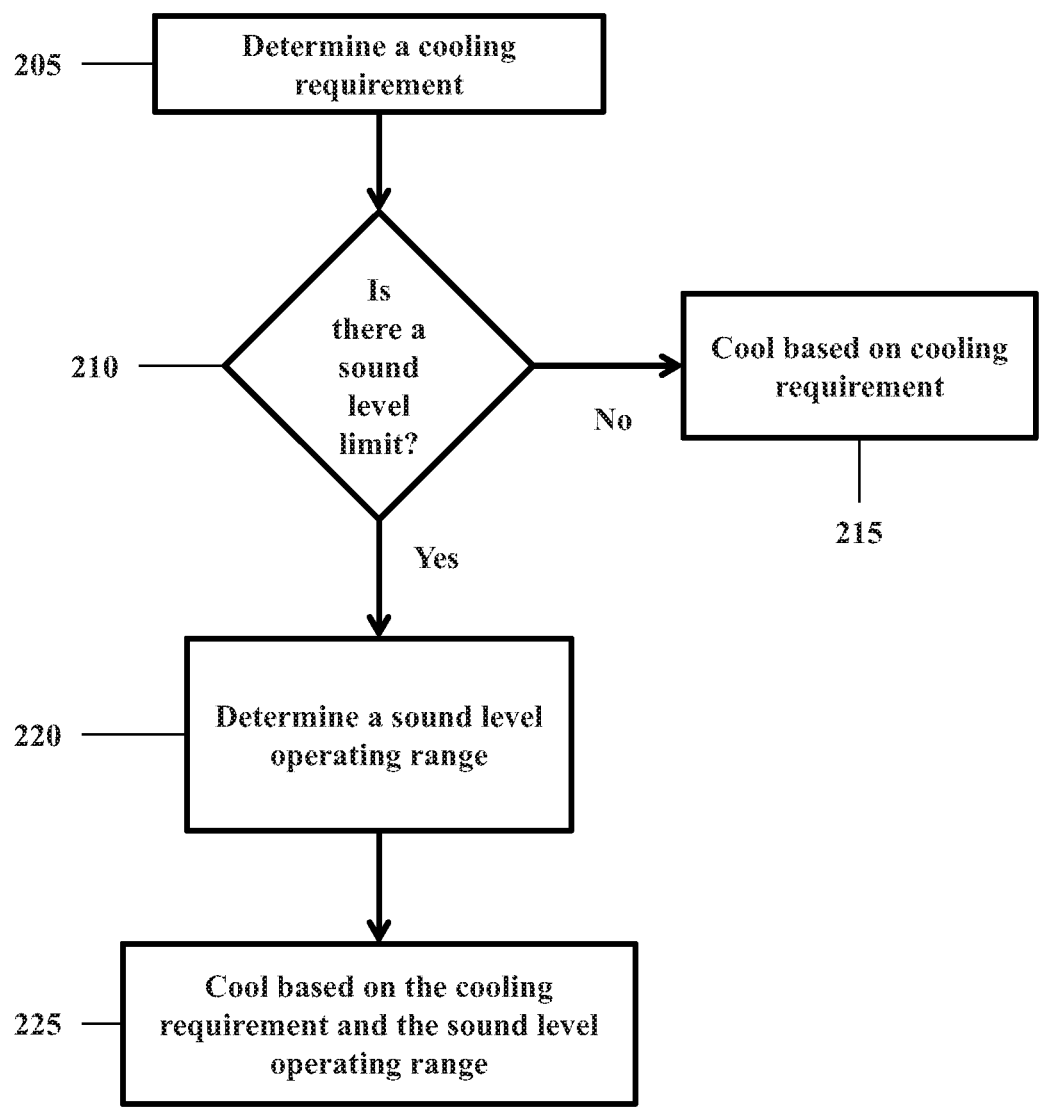
FIG. 2 illustrates a flowchart of a method to control a sound level of a refrigeration unit in an HVAC system, according to some embodiments.

FIG. 2 illustrates a flowchart of a method 200 to control a sound level of a refrigeration unit in an HVAC system (e.g., the HVAC system 100 shown in FIG. 1), according to some embodiments. The method 200 generally includes determining whether a maximum sound level limit has been set and operates based on a cooling requirement and the maximum sound level limit.

The method 200 begins at 205. At 205, a controller (e.g., the controller 140 shown in FIG. 1) determines a cooling requirement. The cooling requirement may be determined based on a setting in a thermostat (e.g., the thermostat 145 as shown in FIG. 1), one or more sensors (e.g., the sensor 130 shown in FIG. 1) in a conditioned space (e.g., the conditioned space 125 shown in FIG. 1), a building automation system, and/or an internal processor of a refrigeration unit (e.g., the refrigeration unit 105 shown in FIG. 1), or the like.

At 210, the controller determines whether a maximum sound level limit has been configured. The maximum sound level limit can be determined based on a setting in a sound controller (e.g., the sound controller 150 shown in FIG. 1). The sound controller can, for example, be configured to include a rule that a sound level of the refrigeration unit cannot exceed a maximum sound level limit. The maximum sound level limit can be based on, for example, a local regulation, a user preference, or other similar noise limitation. In some embodiments, the maximum sound level limit can be defined based on a time of day such that at other times of day there are no sound level limitations.

If a maximum sound level limit has not been defined, the controller sets the refrigeration unit to cool in an efficiency mode according to 215. As discussed above, the efficiency mode includes cooling based on the cooling requirement, which can include setting a compressor (e.g., the compressor 110 shown in FIG. 1) and/or condenser fans (e.g., the condenser fans 115 shown in FIG. 1) to their maximum speeds at which the cooling requirement can be met. In some embodiments, this can include setting the compressor 110 and the condenser fan 115 to their maximum speeds. In some embodiments, this can include setting the compressor 110 and the condenser fan 115 to a speed that is less than their maximum speeds. In some embodiments, the compressor 110 can be set to its maximum speed and the condenser fan 115 can be set to a speed that is less than its maximum speed, or vice versa.

If, however, a maximum sound level limit is determined at 210, the method 200 continues to 220. At 220, the controller determines a sound level operating range. In some embodiments, the sound level operating range can be based on the maximum sound level limit. In some embodiments, 220 can include calculating a maximum allowable compressor speed and/or a maximum allowable condenser fan speed. The maximum allowable compressor and/or condenser fan speeds can be determined based on the maximum sound level limit and cooling requirements for the conditioned space. The maximum allowable compressor speed and maximum allowable condenser fan speed can, for example, be determined by simulation testing to correlate compressor speed, condenser fan speed, and sound levels. In some embodiments, the maximum allowable compressor speeds and condenser fan speeds can be stored in a lookup table. In some embodiments, a regression model (e.g., one or more regression equations or the like) can be used to determine the maximum allowable compressor and condenser fan speeds. In some embodiments, the maximum allowable compressor and condenser fan speeds can be predetermined. In some embodiments, a lookup table can be compiled based on a regression model. Once the sound level operating range has been determined, the method 200 continues to 225.

At 225, the controller sets one or more cooling settings for the refrigeration unit based on the cooling requirement and the sound level operating range. In some embodiments, the one or more cooling settings can be set based on the cooling requirement determined in 205 and the maximum allowable compressor and condenser fan speeds as calculated in 220. In some embodiments, the controller can be configured to skip certain compressor speeds and/or condenser fan speeds that cause structural vibrations and/or additional noise. These compressor and condenser fan speeds can be determined by, for example, simulation testing, historical operation of the refrigeration unit, or the like. In some embodiments, the sound level operating range may provide conditions where the refrigeration unit is unable to meet the cooling requirements. In such embodiments, the refrigeration unit can be configured to get as close as possible to the cooling requirement while still operating within the sound level operating range. The method 200 can repeat while the refrigeration unit is operational. In some embodiments, the method 200 can operate according to a schedule. In some embodiments, the method 200 resets in response to restarting the refrigeration unit.

Figure 3:
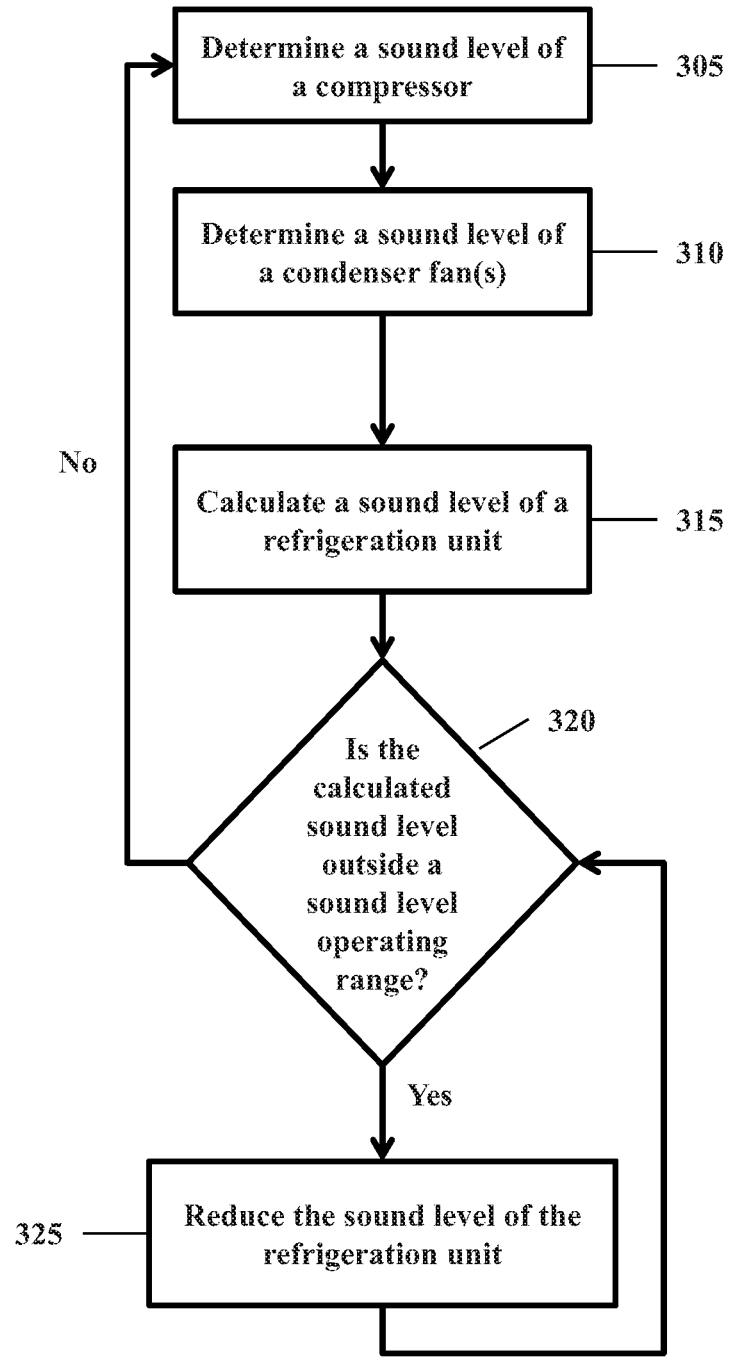
FIG. 3 illustrates a flowchart of a method to control a sound level of a refrigeration unit in an HVAC system, according to other embodiments.

FIG. 3 illustrates a flowchart of a method 300 to control a sound level of a refrigeration unit in an HVAC system (e.g., the HVAC system 100 shown in FIG. 1), according to some embodiments. The method 300 is an alternative to the method 200 described above. Some HVAC systems can be configured to include both of the methods 200 and 300. Aspects of the method 300 can be the same as or similar to aspects of the method 200, according to some embodiments. The method 300 generally includes determining a sound level of a compressor (e.g., the compressor 110 shown in FIG. 1) and/or a sound level of a condenser fan (e.g., the condenser fan 115 shown in FIG. 1) using one or more sensors (e.g., the sensor 135 shown in FIG. 1) and reducing the sound level of the refrigeration unit if the sound level of the refrigeration unit as a whole is greater than a maximum sound level limit. In some embodiments, the method 300 can be configured to reduce the sound level of the refrigeration unit when the sound level approaches the maximum sound level limit.

The method 300 begins at 305. At 305, a controller (e.g., the controller 140 as shown in FIG. 1) determines a sound level of the compressor from a first sensor (e.g., a first of the one or more sensors 135 shown in FIG. 1). At 310 the controller determines a sound level of the condenser fan from a second sensor (e.g., a second of the one or more sensors 135 shown in FIG. 1). At 315, the controller calculates a sound level of the refrigeration unit based on the collective sound level of the compressor and the condenser fan. In some embodiments, the sound level of the refrigeration unit is the aggregate of the compressor sound level and the condenser fan sound level. In some embodiments, the controller can be configured to account for additional noise such as, but not limited to, sound from structural vibrations, by including an additional sound level in the calculation. The additional sound level can act as a buffer to ensure that the refrigeration unit sound level does not get too close to a maximum sound level limit.

In some embodiments, the controller can be configured to skip certain compressor speeds and/or condenser fan speeds that cause structural vibrations. These compressor and condenser fan speeds can be determined by simulation testing or by historical operation of the refrigeration unit.

At 320, the controller determines whether the sound level of the refrigeration unit is outside a sound level operating range. In some embodiments, the controller determines the sound level operating range from a sound controller (e.g., the sound controller 150 shown in FIG. 1). In some embodiments, the sound level operating range is based on a maximum sound level limit. If the calculated sound level is within the sound level operating range, then the method 300 continues to 305. If, however, the calculated sound level is outside the sound level operating range, then the method 300 continues to 325. The sound level operating range can, in some embodiments, be offset from the maximum sound level limit to ensure that the maximum sound level limit is not exceeded. This offset can be a system-defined value that is capable of being overridden by a user.

At 325 the controller takes one or more actions to reduce the sound level of the refrigeration unit. The controller can take various actions to reduce the sound level of the refrigeration unit, according to some embodiments. In some embodiments, the controller can reduce the capacity of the compressor and/or condenser fans. Reducing the capacity of the compressor and/or condenser fans can, for example, include: (1) reducing the speed of the compressor, (2) reducing the speed of the condenser fan, or (3) reducing the speed of both the compressor and the condenser fan. In some embodiments, the refrigeration unit can include more than one condenser fan. In such embodiments, reducing the sound level of the refrigeration unit can also include reducing the speed of all (or less than all) of the condenser fans. In some embodiments, the controller can reduce an efficiency of the refrigeration unit without affecting the capacity of the refrigeration unit. In such embodiments, the controller can increase the speed of the compressor and reduce the speed of the condenser fan, or alternatively, reduce the speed of the compressor and increase the speed of the condenser fan. While capacity may remain the same in such embodiments, power consumption, and therefore efficiency, may be reduced. The controller can determine a balance of capacity and efficiency in which any reduction in efficiency is minimized.

Following 325, the method 300 returns to 305 and determines the sound level of the refrigeration unit. In some embodiments, the method 300 repeats while the refrigeration unit is operational. In some embodiments, the method 300 can repeat according to a schedule.

Aspects: It is noted that any of aspects 1-7 below can be combined with each other in any combination and combined with any of aspects 8-12, 13-22, or 23-33. Any of aspects 8-12, 13-22, or 23-33 can be combined with each other in any combination.

Aspect 1. A method of controlling a refrigeration unit for a heating, ventilation, and air conditioning (HVAC) system, comprising:

determining, by a controller, a cooling requirement of a conditioned space;

determining, by the controller, a sound level operating range for the refrigeration unit; and applying a cooling setting based on the cooling requirement and the sound level operating range.

Aspect 2. The method according to aspect 1, further comprising:

calculating, by the controller, a maximum capacity of the refrigeration unit based on the sound level operating range for the refrigeration unit.

Aspect 3. The method according to aspect 2, wherein calculating the maximum capacity comprises:

determining, by the controller, one of a maximum allowable compressor speed and/or a maximum allowable condenser fan speed based on the sound level operating range for the refrigeration unit.

Aspect 4. The method according to aspect 3, wherein the determining comprises calculating the maximum allowable compressor speed and/or maximum allowable condenser fan speed based on the sound level operating range from one or more regression equations.

Aspect 5. The method according to any of aspects 1-4, further comprising: setting the sound level operating range to include a sound level of the refrigeration unit when operating at the maximum capacity.

Aspect 6. The method according to any of aspects 3-5, further comprising:

skipping one of a compressor speed and a fan speed at which a structural resonance causes the refrigeration unit to operate outside the sound level operating range.

Aspect 7. The method according to any of aspects 1-6, further comprising:

limiting the sound level operating range based on a time of day.

Aspect 8. A method of controlling a refrigeration unit for a heating, ventilation, and air conditioning (HVAC) system, comprising:

determining, by a controller, a sound level operating range for a refrigeration unit;

determining, by a controller, a cooling requirement of a conditioned space;

determining an operating condition range of the compressor and an operating condition range of the condenser fan, wherein the operating condition ranges of the compressor and the condenser fan are calculated from one or more regression equations; and applying a cooling setting based on the cooling requirement that is within the operating condition ranges of the compressor and the condenser fan.

Aspect 9. The method according to aspect 8, wherein the operating condition range of the compressor comprises a compressor speed range.

Aspect 10. The method according to any of aspects 8-9, wherein the operating condition range of the condenser fan comprises a condenser fan speed range.

Aspect 11. The method according to any of aspects 8-10, wherein the one or more regression equations correlate compressor speed and a sound level of the compressor.

Aspect 12. The method according to any of aspects 8-11, wherein the one or more regression equations correlate condenser fan speed and a sound level of the condenser.

Aspect 13. A method of controlling a refrigeration unit for a heating, ventilation, and air conditioning (HVAC) system, comprising:

determining a sound level of a compressor with a first sensor and a sound level of a condenser fan with a second sensor;

calculating, by a sound controller, a sound level of the refrigeration unit based on the sound levels of the compressor and the condenser fan; and reducing the sound level of the refrigeration unit in response to the calculated sound level being outside a sound level operating range.

Aspect 14. The method according to aspect 13, wherein reducing the sound level of the refrigeration unit comprises decreasing an efficiency of the refrigeration unit.

Aspect 15. The method according to aspect 14, wherein decreasing the efficiency of the refrigeration unit comprises increasing a speed of the compressor and reducing a speed of the condenser fan.

Aspect 16. The method according to aspect 14, wherein decreasing the efficiency of the refrigeration unit comprises reducing a speed of the compressor and increasing a speed of the condenser fan.

Aspect 17. The method according to any of aspects 13-17, wherein reducing the sound level of the refrigeration unit comprises:

reducing a capacity of the refrigeration unit.

Aspect 18. The method according to aspect 17, wherein reducing the sound level of the refrigeration unit comprises:

reducing a speed of one of the compressor and the condenser fan.

Aspect 19. The method according to aspect 17, wherein reducing the sound level of the refrigeration unit comprises:

reducing speeds of the compressor and condenser fan.

Aspect 20. The method according to any of aspects 13-19, further comprising:

setting the sound level operating range to include a sound level of the refrigeration unit when operating at a maximum capacity.

Aspect 21. The method according to any of aspects 13-20, further comprising:

skipping one of a compressor speed and a fan speed at which a structural resonance causes the refrigeration unit to operate outside the sound level operating range.

Aspect 22. The method according to any of aspects 13-21, further comprising:

limiting the sound level operating range based on a time of day.

Aspect 23. A heating, ventilation, and air conditioning (HVAC) system, comprising:
a refrigeration unit comprising:
a compressor, a condenser fan, a controller, and a sound controller,
wherein the sound controller is configured to maintain a sound level of the refrigeration unit within a sound level operating range.

Aspect 24. The HVAC system according to aspect 23, further comprising:
a first sensor configured to determine a sound level of the compressor.

Aspect 25. The HVAC system according to aspect 24, further comprising:
a second sensor configured to determine a sound level of the condenser fan.

Aspect 26. The HVAC system according to aspect 25, wherein one of the first sensor and the second sensor is a microphone.

Aspect 27. The HVAC system according to aspect 25, wherein one of the first sensor and the second sensor is an RPM (revolutions per minute) sensor.

Aspect 28. The HVAC system according to aspect 25, wherein one of the first sensor and the second sensor is an accelerometer.

Aspect 29. The HVAC system according to aspect 25, wherein one of the first sensor and the second sensor is a pressure transducer.

Aspect 30. The HVAC system according to any of aspects 23-29, wherein the sound controller is configured to:
determine a sound level of the compressor;
determine a sound level of the condenser fan;
calculate a sound level of the refrigeration unit based on the sound levels of the compressor and the condenser fan; and
control the sound level of the HVAC system within a sound level operating range.

Aspect 31. The HVAC system according aspect 30, the sound controller configured to:
determine a sound level operating range for the refrigeration unit; and
apply a cooling setting based on the cooling requirement and the sound level operating range.

Aspect 32. The HVAC system according to aspect 30, wherein one of the sound level of the compressor and the sound level of the condenser fan are determined from a regression model.

Aspect 33. The HVAC system according to aspect 32, wherein the regression model includes one or more regression equations.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used within this specification may, but does not necessarily, refer to the same embodiment. This specification and the embodiments described are exemplary only. Other and further embodiments may be devised without departing from the basic scope thereof, with the true scope and spirit of the disclosure being indicated by the claims that follow.

What is claimed is:

1. A method of controlling a refrigeration unit for a heating, ventilation, and air conditioning (HVAC) system, comprising:
determining, by a controller, a cooling requirement of a conditioned space;
determining, by the controller, a sound level operating range for the refrigeration unit;
applying a cooling setting based on the cooling requirement and the sound level operating range;
calculating, by the controller, a maximum capacity of the refrigeration unit based on the sound level operating range for the refrigeration unit; and
excluding a compressor speed at which a structural resonance causes the refrigeration unit to operate outside the sound level operating range from the sound level operating range for the refrigeration unit.

2. The method according to claim 1, wherein calculating the maximum capacity comprises:
determining, by the controller, a maximum allowable compressor speed based on the sound level operating range for the refrigeration unit.

3. The method according to claim 1, further comprising:
limiting the sound level operating range based on a time of day.

4. The method according to claim 1, further comprising:
calculating, by the controller, a capacity range of the refrigeration unit based on the sound level operating range for the refrigeration unit, the calculating including determining an operating condition of a compressor of the refrigeration unit, wherein the operating condition is determined such that the refrigeration unit outputs a sound level within the sound level operating range.

5. A method of controlling a refrigeration unit for a heating, ventilation, and air conditioning (HVAC) system, comprising:
determining, by a controller, a sound level operating range for a refrigeration unit;
determining, by a controller, a cooling requirement of a conditioned space;
determining an operating condition range of the compressor;
applying a cooling setting based on the cooling requirement that is within the operating condition range of the compressor; and
excluding a compressor speed at which a structural resonance causes the refrigeration unit to operate outside the sound level operating range from the sound level operating range for the refrigeration unit.

6. The method according to claim 5, wherein the operating condition range of the compressor comprises a compressor speed range.

7. The method according to claim 5, wherein applying a cooling setting comprises reducing a capacity of the refrigeration unit.

8. The method according to claim 5, wherein the applying comprises decreasing an efficiency of the refrigeration unit.

9. The method according to claim 5, further comprising:
limiting the sound level operating range based on a time of day.

10. A heating, ventilation, and air conditioning (HVAC) system, comprising:

a refrigeration unit comprising:
  a compressor, a condenser fan, a controller, and a sound controller,
  wherein the sound controller is configured to maintain a sound level of the refrigeration unit within a sound level operating range, the sound controller configured to:
  determine a cooling requirement of a conditioned space;
  determine, by the controller the sound level operating range for the refrigeration unit;
  apply a cooling setting based on the cooling requirement and the sound level operating range;
  calculate a maximum capacity of the refrigeration unit based on the sound level operating range for the refrigeration unit and
  exclude a compressor speed at which a structural resonance causes the refrigeration unit to operate outside the sound level operating range from the sound level operating range for the refrigeration unit.

11. The HVAC system according to claim 10, wherein the compressor is a variable speed compressor.

12. The HVAC system according to claim 11, wherein the sound controller is configured to reduce a speed of the variable speed compressor when the cooling setting includes one or more settings outside the sound level operating range.

13. The HVAC system according to claim 11, wherein the sound controller is configured to reduce a capacity of the refrigeration unit when the cooling setting includes one or more settings outside the sound level operating range.

* * * * *